US012024947B2

(12) United States Patent
Geiger et al.

(10) Patent No.: US 12,024,947 B2
(45) Date of Patent: Jul. 2, 2024

(54) WINDOW SHADE MOUNTING ASSEMBLY

(71) Applicant: Geigtech East Bay, LLC, Charleston, SC (US)

(72) Inventors: James Geiger, Charleston, SC (US); John Nix, Charleston, SC (US); Charles Lovely, Charleston, SC (US)

(73) Assignee: Geigtech East Bay, LLC, Charleston, SC (US)

( * ) Notice: Subject to any disclaimer, the term of this patent is extended or adjusted under 35 U.S.C. 154(b) by 227 days.

(21) Appl. No.: 17/405,844

(22) Filed: Aug. 18, 2021

(65) Prior Publication Data

US 2022/0056759 A1 Feb. 24, 2022

Related U.S. Application Data

(60) Provisional application No. 63/067,229, filed on Aug. 18, 2020.

(51) Int. Cl.
*E06B 9/44* (2006.01)
*E06B 9/50* (2006.01)

(52) U.S. Cl.
CPC . *E06B 9/44* (2013.01); *E06B 9/50* (2013.01)

(58) Field of Classification Search
CPC .................................... E06B 9/44; E06B 9/42
USPC ............ 248/220.21, 221.11, 222.51, 222.52, 248/225.21; 160/310, 311, 312, 120, 241, 160/903
See application file for complete search history.

(56) References Cited

U.S. PATENT DOCUMENTS

2004/0129849 A1* 7/2004 Walker ...................... E06B 9/72 248/266
2005/0178941 A1* 8/2005 Burns .................... F16M 11/10 248/475.1
2020/0399958 A1* 12/2020 Geiger ...................... E06B 9/42

* cited by examiner

*Primary Examiner* — Kimberly T Wood
(74) *Attorney, Agent, or Firm* — Kim and Lahey Law Firm, LLC; Douglas W. Kim

(57) ABSTRACT

A window shade mounting system comprising: a mounting bracket having a first slot for receiving a portion of a hanger band; a roller shade bracket attached to the hanger band; a roller window shade assembly attached to the roller shade bracket; a defined cavity defined by the support band, hanger band or both; and, wherein the support band and the hanger band have the same cross section.

17 Claims, 12 Drawing Sheets

WINDOW SHADE MOUNTING ASSEMBLY

RELATED PATENT APPLICATIONS

This application is a non-provisional patent application claiming priority on U.S. provisional patent application Ser. No. 63/067,229 filed Aug. 18, 2020, which is incorporated by reference.

BACKGROUND OF THE INVENTION

1) Field of the Invention

The present invention relates to fastening devices such as mounts, brackets, bracket assemblies, and mounting systems for the installation of roller window shades.

2) Description of the Related Art

Shading systems, including roller window shades, are desirable for existing and new building construction and can improve or enhance style, provide privacy, assist with regulating temperature, reduce air conditioning and heating costs, and control light. United States Patent Current brackets and mounts for roller window shades are typically bulky, visible, use separate clips, and may detract from the aesthetics of the shade system. For example, U.S. Pat. No. 6,817,402 discloses a cassette system for window treatment includes a head rail with a base, end brackets attached to the base which use a hardware kit to mount the brackets. The hardware to install a window shade typically includes at least several brackets, screws, and anchors. Placement of the hardware is important because if the hardware is misaligned, the shade may not function and detract from the aesthetics by looking crooked. Further, the hardware itself is typically not aesthetically pleasing.

Additionally, when fitting window shades, it is desirable to minimize the gap between the lateral edges of roller shades and the inside wall of the window opening. While there are certain standard sizes, for improved aesthetics, the window shade is custom fit for each window. Typically, this requires the window to be measured, the shades to be cut to the measured size, shipped to the installation location, matched to the window, and professionally installed, especially for roller window shades. There is a need for an improved mounting system for mounting window shades, including window roller shades, motorized and non-motorized that can simplify the fitting and installation process while also reduce the margin of error for installations.

It would also be advantageous to have a powered roller shade assembly that can take advantage of easily connectable wiring such as shown in U.S. Pat. No. 7,311,526 which discloses a Magnetic Connector For Electronic Device that is an electrical plug and receptacle relying on magnetic force to maintain contact and U.S. Pat. No. 9,362,664 entitled Connecting Device And Electronic Device Assembly that discloses a connection device that includes a plurality of electrical contacts and a magnetic-metal set.

It is an object of the present invention to provide for an easy to install, aesthetically pleasing, mounting assembly for window shades.

BRIEF SUMMARY OF THE INVENTION

What is provided herein is a roller shade mounting assembly that can include: a support band configured to be attached to a support surface, wherein the support band includes a support catch and a support slot; a first slot defined in the support catch and a second slot defined in the support catch; a hanger band having a hanger slot and a hanger catch wherein the first slot is configured to receive the hanger band and the support slot is configured to receive the hanger catch when a roller shade bracket attached to the hanger band is in a mounted position; a wiring channel defined between the support band and the hanger band to receive a first wire, a first connector, a second wire and a second connector when the roller shade bracket is in the mounted position; and, wherein the second slot is configured to receive the hanger band when the roller shade bracket is in an access position and configured to position the hanger catch away from the support slot.

The hanger slot arm can be configured to be received in the first slot and the second slot. The first connector and the second connector can be connected by magnetic force. A level can be attached to the support band. A lock can be configured to secure the roller shade bracket to the support band. The hanger band can be a first hanger band and a second hanger band can be supported by the support band. The hanger band can include a left roller shade bracket and a right roller shade bracket affixed to the hanger band. A roller shade can be supported by the left roller shade bracket and the right roller shade bracket.

The roller shade mounting assembly can include: a support band configured to be attached to a support surface, wherein the support band includes a support catch and a support slot; a hanger band having a hanger slot and a hanger catch wherein the hanger slot is configured to receive the support catch and the support slot is configured to receive the hanger catch when a roller shade bracket attached to the hanger band is in a mounted position; and, a wiring channel defined between the support band and the hanger band to receive a wire when the roller shade bracket is in the mounted position.

The support band and the hanger band can be configured to obscure the wire from an observer when the roller shade bracket is in the mounted position. An electrical strip can be attached to the support band and connected to an external power source; and, an electric contact can be connected to the roller shade bracket and configured to contact the electrical strip when the roller shade bracket is in the mounted position. This electric contact can be magnetic. The wire can be an external power wire, and a second wire can attach to the external power wire to provide power to a roller shade motor. The external power wire and the second wire can be connected magnetically.

A first slot defined in the support catch and a second slot defined in the support catch can define an angle between the first slot and the second slot in a range of twenty to sixty degrees. The angle of the roller shade bracket in an access position relative to the mounted position can be in a range of twenty to sixty degrees. An angle of the roller shade bracket in an access position relative to the mounted position can be forty-five degrees.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1:
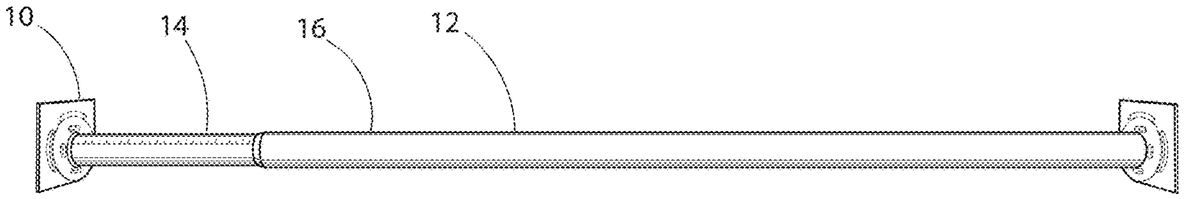
FIG. 1 is front view of aspects of the assembly.

Referring to FIG. 1, a fitting bracket 10 is shown removable attached to a measuring rod 12. The measuring rod can include an inner rod 14 and an outer rod 16 that are slidably attached to each other. The inner rod can be received in the outer rod allowing the length of the measuring rod to vary. A spring can be disposed within the inner rod or outer rod to bias the inner rod and the outer rod outward. Therefore the measuring rod can be compressed, placed in the window and the spring will bias the measuring rod against the window sill to assist in securing the measuring rod in place and helping ensure that the measuring rod will accurately show the window sill width.

Figure 2:
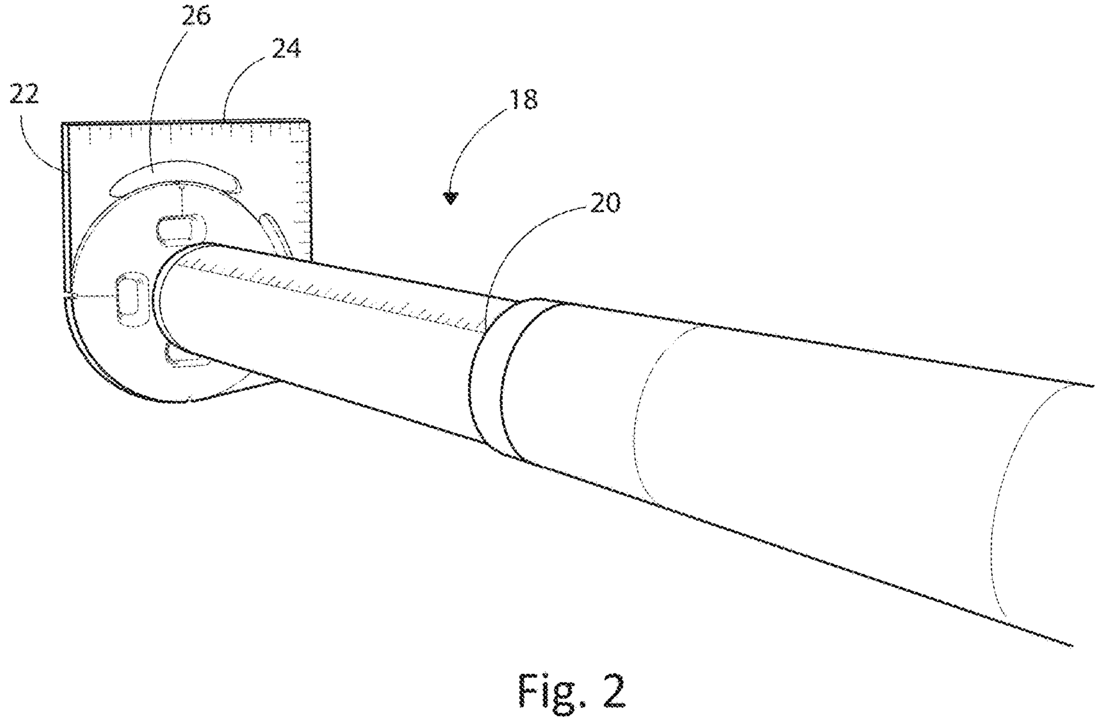
FIG. 2 is a perspective view of aspects of the assembly.

Referring to FIG. 2, the measuring rod can include measuring marks 18 that indicate the window width and assist with fitting the shades in the window. When the measuring rod is placed on the window, the width of the window is shown at an indication point 20. The measuring rod bracket 22 can attach to an end of the measuring rod so that the dimensions of the mounting bracket and the roller windows shade mandrel are accounted for when determining the width of the window. The measuring rod bracket can include tick marks 24 and openings 26 so that the location of openings for fasteners can be marked for installation of the roller window shade. When the measuring rod is in place, markings can be made using the measuring rod bracket to indicate the location of fasteners, for example, the location of pilot holes and the like. The measuring rod bracket can be used for inside mount, outside mount and ceiling mount.

When the roller window shade is manufactured, it can be shipped to the installation location in a manner where the brackets and the mandrel of the roller window shade are removed from the packaging. The location for installation of the bracket included with the roller window shade can have been previously marked using the measuring rod bracket.

Figure 3:
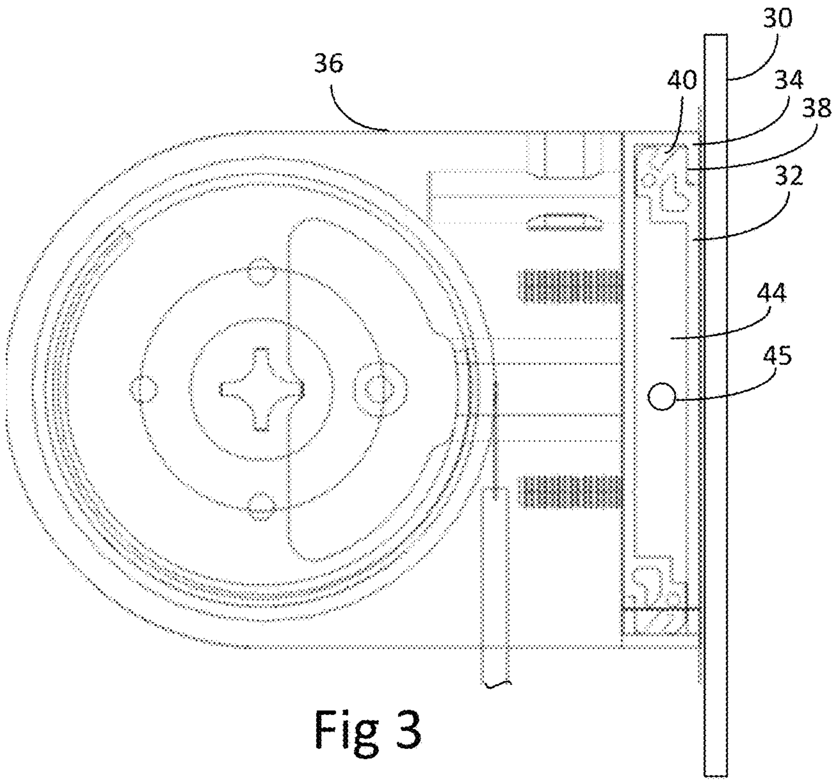
FIG. 3 is a schematic of aspects of the assembly.

Referring to FIG. 3, one embodiment of a bracket system is shown in a first position corresponding to an installation position. The support surface 30 can have the support bracket or support band 32 affixed to the support surface. The support band does not need to rely upon brackets to hold the support band to the support surface allowing for the support band to be adjacent to the support surface. A hanger band 34 engages with the support band and supports roller shade bracket 36, which supports the roller window shade. The support band can include a first slot 38 that can be defined in the support band or defined between the support band and the support surface. A second slot 40 can be defined in the support band. A wiring channel 44 can be disposed between the support band and the hanger band for receiving wiring 45 that can deliver power to the roller window shade. When the support band support a first hanger band and a second hanger band, a gap can be defined between the two hanger bands. The gap can be defined between the roller shade brackets that are attached to the hanger bands. A wire or other electrical connector can extend through the gap so that multiple roller shade assemblies and motors can be powered from a wire connected to a single external power source. The wiring channel allows for the wiring to be concealed from an observer and enhance the aesthetics of the roller window shade assembly. The support band and the hanger band can have the same dimensions where the support band is vertically inverted relative to the hanger band when installed. The use of the support band and the hanger band can eliminate the need for the traditional clips.

Figure 4:
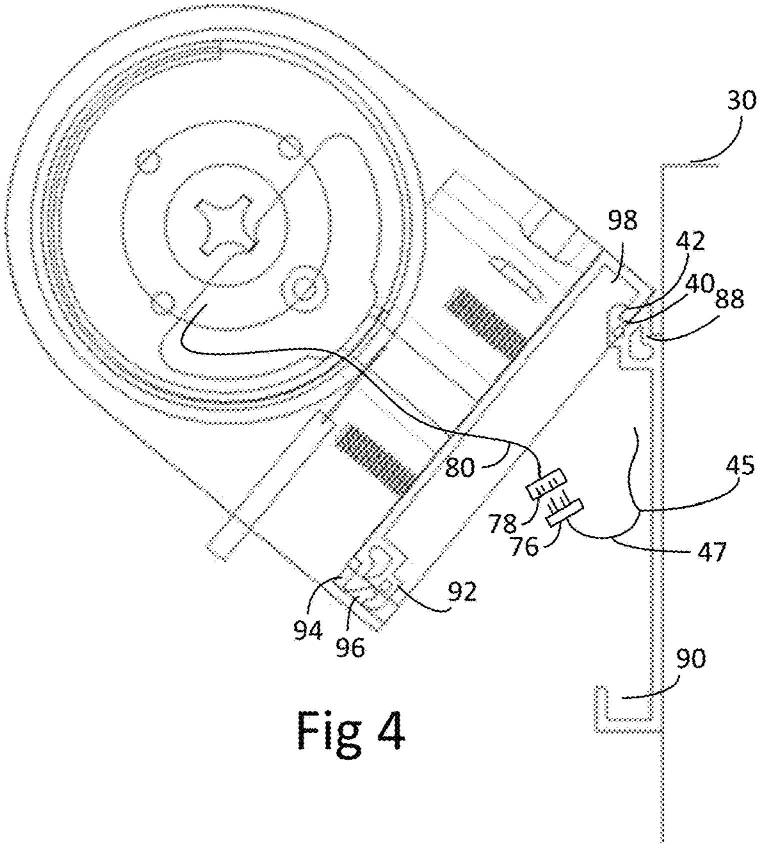
FIG. 4 is a schematic of aspects of the assembly.

Referring to FIG. 4, the hanger band is shown with an edge 42 received in the second slot to position the support band in a second position away from the support surface. This second position allows for wiring to be placed in the wiring channel and access for other servicing needs. The wiring 45 can include a first wire 47 that connects to a power source and delivers power to a motor associated with the roller shade assembly. The first wire can include a first connector 76 that can be removable connected to a second connector 78. The second connector can be attached to a second wire 80 that can be in electronic communications or attached to the motor of the roller shade assembly. The first connector can be an electrical plug and the second connector can be a receptacle wherein the first and the second connectors relying on magnetic force to maintain contact. The first connector and the second connect can be obscured from an observer by the support bracket, hanger bracket, roller shade bracket, wiring cavity or any combination thereof. One of the connectors can also be flush with an outer wall or edge of the support bracket, hanger bracket or roller shade bracket so that if the motor of the roller shade assembly is battery powered, the second connector can be removably attached to the first connector to charge the battery.

The support band can include a support catch 88 included in the support band. The support catch can include the first slot and the second slot. The support band can include a support slot 90 configured to receive a hanger slot catch 92. The hanger catch can include a first hanger catch slot 94 and a second hanger catch slot 96. The hanger band can include a hanger slot 98.

Figure 5:
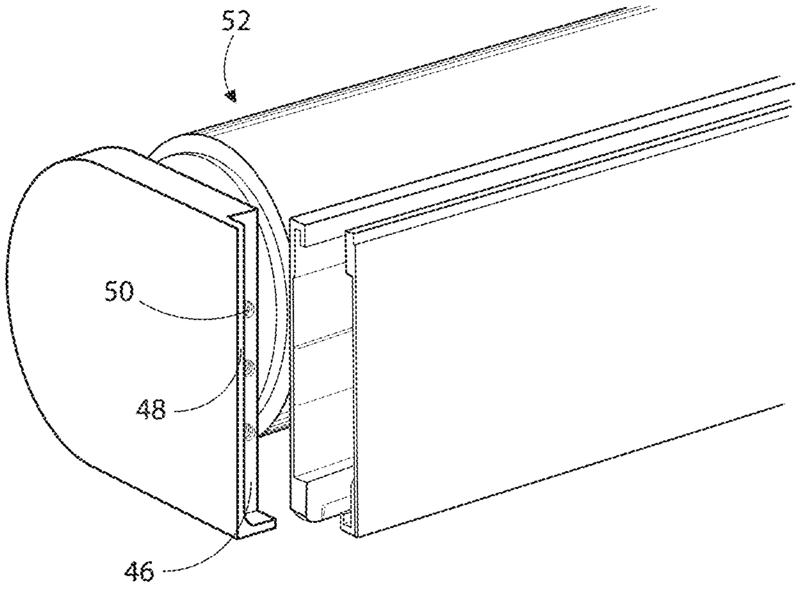
FIG. 5 is a perspective view of aspects of the assembly.

Referring to FIG. 5, the support band is shown detached from the support surface. The support band can include an end that can extend past an end of the hanger band. A roller shade bracket can define a cavity 46 that can receive the end of the hanger band. The roller shade bracket can include an edge 48 that is disposed adjacent to the end of mounting bracket when the assembly is installed. The roller shade bracket defines a wiring channel 50 that allows wiring to extend from the wiring channel through the roller shade bracket and to a motor included in a roller window shade assembly 52.

In one embodiment, once the shades were manufactured, the roller window shade assembly can be mounted on the roller shade bracket and the roller shade bracket attaches to the hanger band. Therefore, the installation process involves affixing the support band to a support surface and placing the hanger band on the support band.

Figure 6:
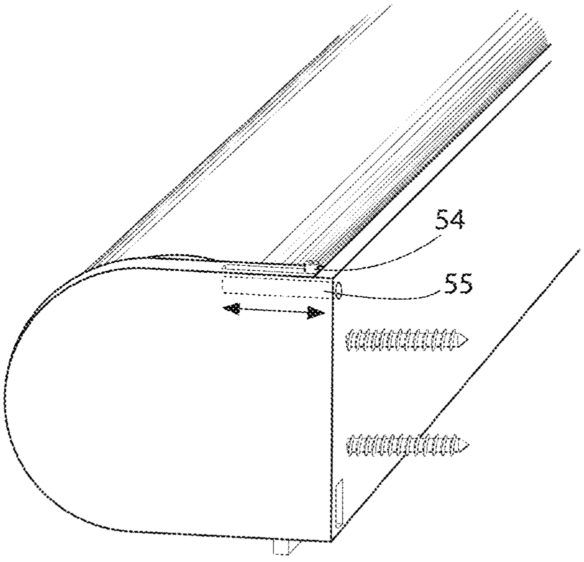
FIG. 6 is a perspective view of aspects of the assembly.

Referring to FIG. 6, the roller shade bracket can include a lock 54 that, when engaged, prevents the hanger band from being removed from the mounting bracket. The lock can also prevent the hanger band from sliding laterally along the mounting bracket. Pin 55 can extend from the roller shade bracket, through the hanger band and into the support band. When released, the pin does not extend through the support band and allows the hanger band to be removed from the support band or to slide along the support band.

Figure 7:
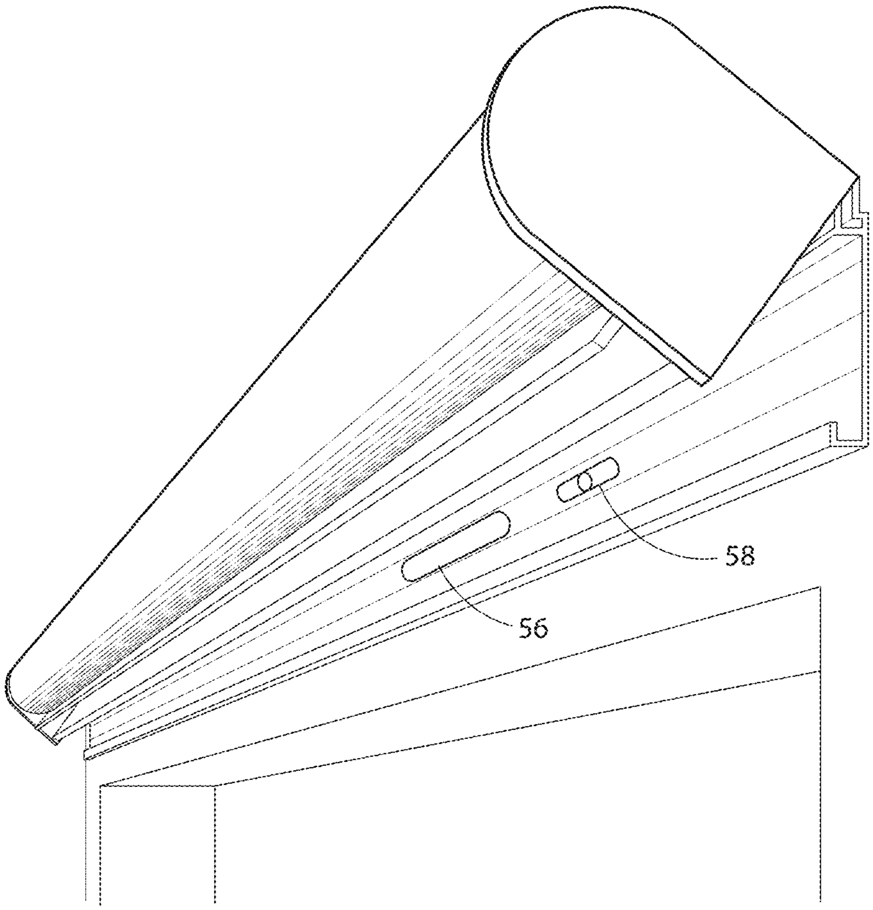
FIG. 7 is a perspective view of aspects of the assembly.

Referring to FIG. 7, the support band can include an adjustment opening 56 that allows for the support band to be held on the support surface while also allowing the support band to move laterally to adjust the position of the support band relative to the window sill. A level 58 can be included and attached to the support band to assist with installation of the support band. Multiple levels can be included on the support band for vertical and horizontal positioning, for inside window wills, outside window sill and ceiling positions.

Figure 8:
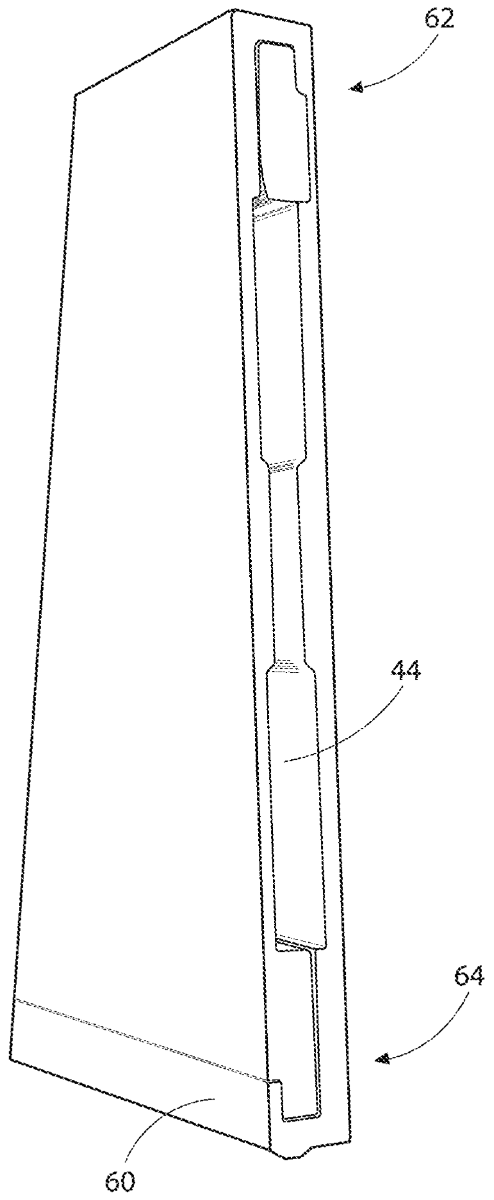
FIG. 8 is a perspective view of aspects of the assembly.

Referring to FIG. 8, the support band is shown having a lower face 60 that can be observed when the hanger band is attached to the support band. As shown the support band and the hanger band can have the same cross section so that one bracket can be used where the bracket is a support band when in one position and a hanger band when inverted. The support backet and the hanger band can engage to form an upper connection 62 and a lower connection 64.

Figure 9A:
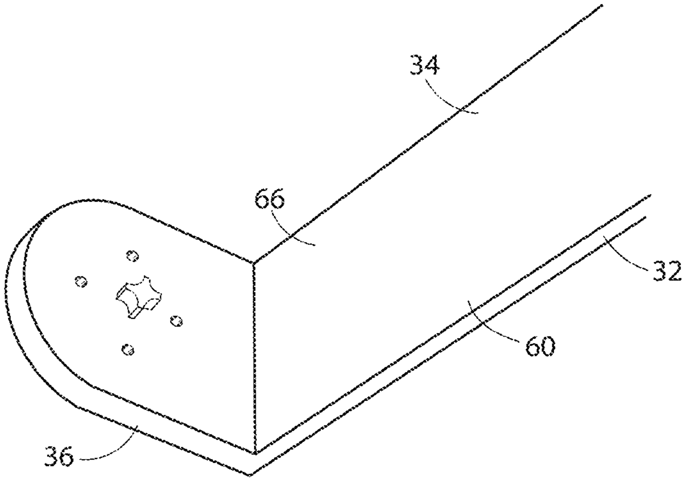
FIG. 9A is a perspective view of aspects of the assembly.
Figure 9B:
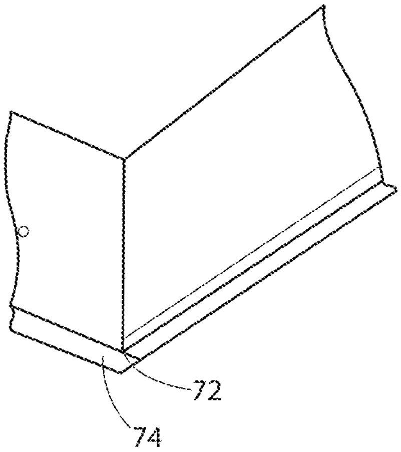
FIG. 9B is a perspective view of aspects of the assembly.

Referring to FIGS. 9A and 9B, the assembled support band 32, hanger band 34 and roller shade bracket 36, when connected, provide for the aesthetic appearance that these components appear to be one piece. The lower face 60 can be planar with the outer wall 66 of the hanger band so that the lower face and the outer wall appear as a smooth surface. An edge of the hanger band 70 can be recessed relative to the edge of the support band so that a support band lower edge 72 is adjacent to a roller shade bracket lower edge 74 so that these lower edges appear as a smooth surface. In one embodiment the edge of the roller shade bracket extended downward and adjacent to the support band lower edge is about 1/16 inch in height. The edge of the hanger band can extend to the far edge of the roller shade bracket.

Figure 10:
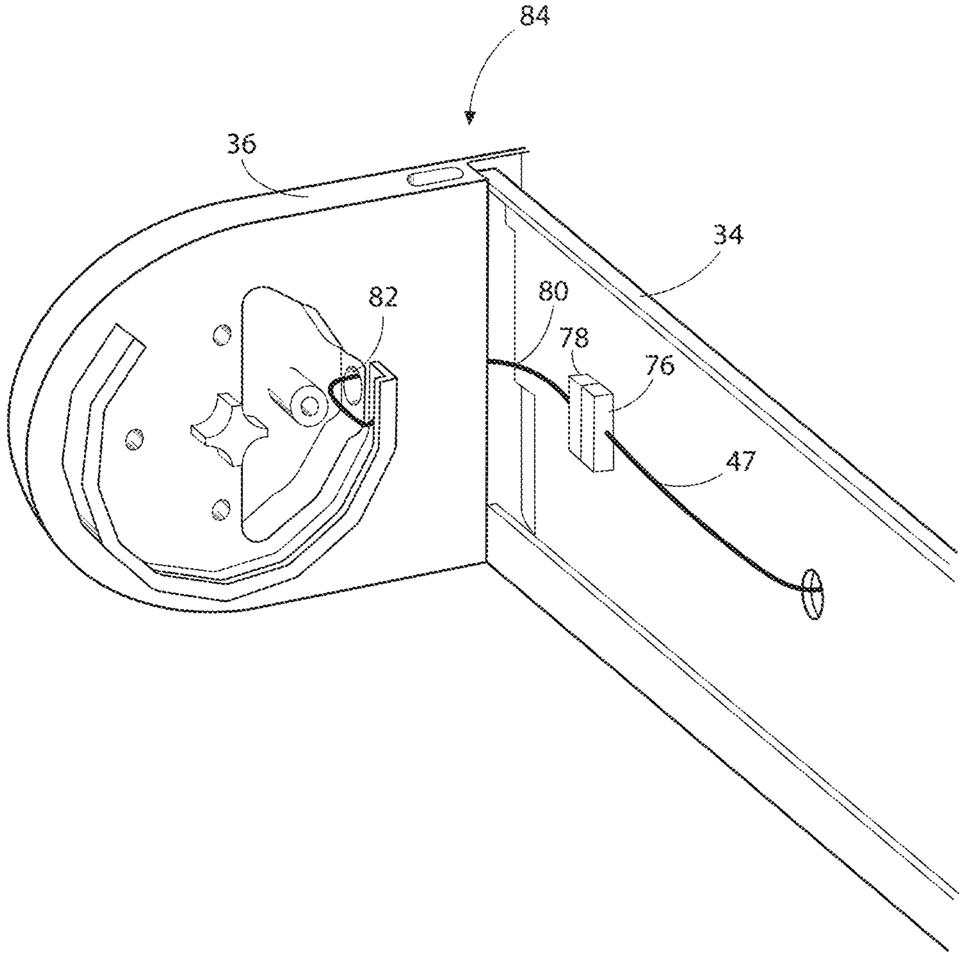
FIG. 10 is a perspective view of aspects of the assembly.

Referring to FIG. 10, the support band 34 can include an opening 84 for receiving a wire 47 from a power source. The wire can be adjacent to or extend from the support surface. The first connector 76 and the second connector 78 can disposed in the wiring cavity and therefore obscured from an observer when the hanger band is in the first position. The wire can extend through the roller shade bracket through passage 82 that can extend from a first side 84 of the roller shade bracket that is against the hanger band, through the passage and to the roller shade assembly. In this embodiment the wiring and connectors can be completely obscured from the observer by the hanger band, roller shade bracket, roller shade assembly or any combination thereof. The wire 47 can include multiple connectors along the length of the wire so that power to one or more roller shade assemblies and motors can be provided. Therefore, an external power source can be connected to the wire as a point along the support band to power the one or more motors. The external power source can be a single wire extending through the support band for powering multiple roller shade assemblies and motors.

Figure 11:
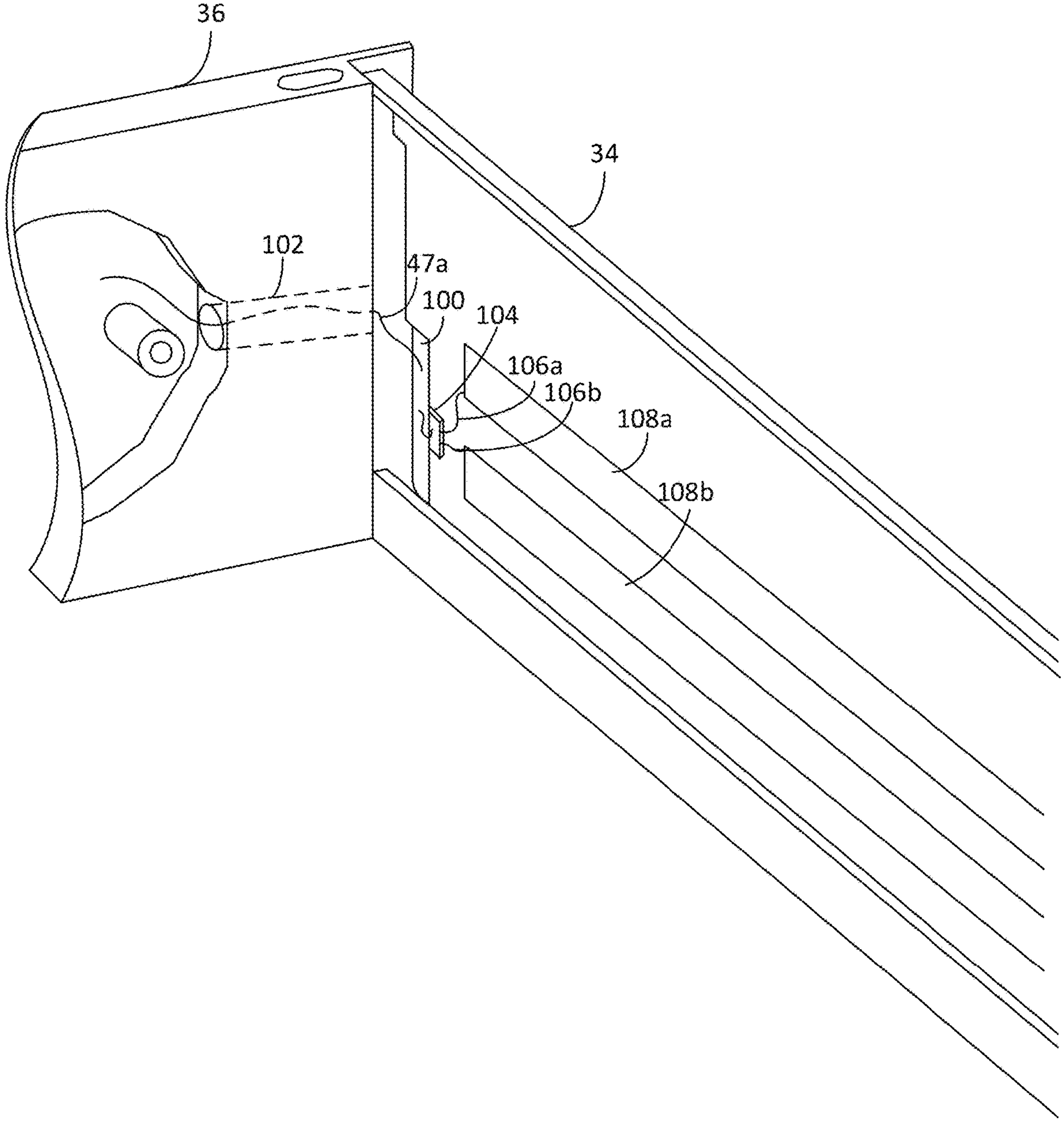
FIG. 11 is a perspective view of aspects of the assembly.

Referring to FIG. 11, the support band 34 is show attached to a roller shade bracket 36. The roller shade bracket supports a roller shade that can be motorized or manual. A wire 47*a* can be connected to an external power source and can extend through an opening 100 in the support band, extend through the roller hade bracket and power a roller shade motor. The support band can observe the wire from an observer. The support band and the roller shade bracket can in combination observe the wire from an observer. The roller shade can include a channel 102 defined in the roller shade bracket that receive the wire. The wire can also attach to a connection 104 which can include a positive lead 106*a* and a negative lead 106*b*. The positive lead can attach to a first electrical strip 108*a* and a second electrical strip 108*b*. The electrical strips can contact electric contacts that are attached to a roller shade motor so that power is provided to the roller shade motor. The electrical strips can be disposed on a back side of the support band, on the support catch in the support slot or other location on the support band. The electric contacts can be on a face of the hanger band, hanger in the hanger slot or on the hanger catch. The electrical strips and the electric contacts reduce or eliminate the need to manually wire the power to the roller shade motor. The electric strips can extend along the support band so that one or more roller shade assemblies can be powered by the support band.

Figure 12:
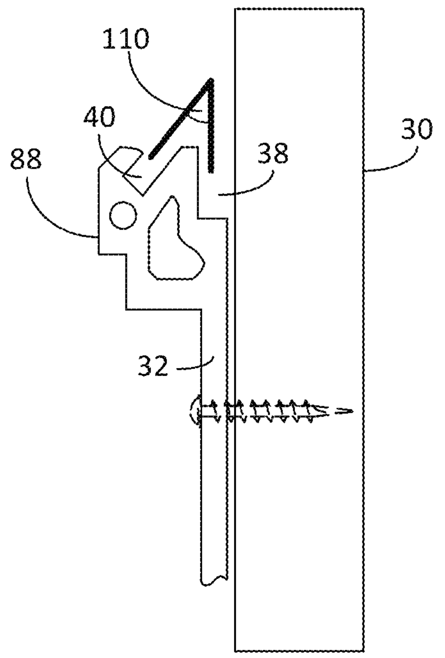
FIG. 12 is a cross-section of aspects of the assembly.

Referring to FIG. 12, a portion of the support band secured to a support surface 30 is shown having the support catch 88. An angle 110 between the first slot 38 and the second slot 40 can be in a range of forty to sixty degrees. The angle 110 between the support bracket and the hanging bracket can be in a range of forty to sixty degrees. The angle 110 between the roller shade bracket and the hanging bracket can be in a range of forty to sixty degrees. The angle 110 between the roller shade bracket and the support surface can be in a range of forty to sixty degrees. In one embodiment, the angle 110 is forty-five degrees.

Figure 13:
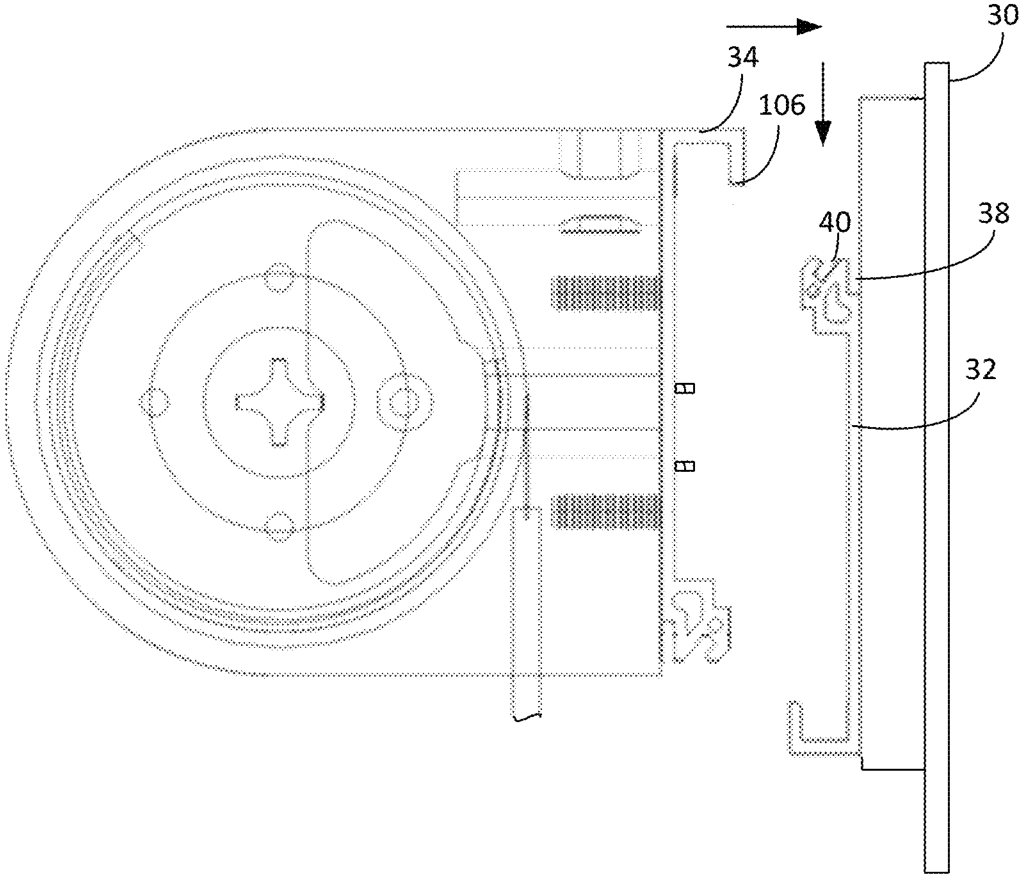
FIG. 13 is a cross-section of aspects of the assembly.

Referring to FIG. 13, the support bracket 32 is shown disconnected from the hanging band 34. A hanger slot arm 106 defined in the hanger band 34 can be received into a first slot 38 or a second slot 40. When the hanger band is received in the first slot, the hanger band and roller shade bracket are in a mounted position. When the hanger slot arm is received in the second slot, the hanger band and the roller shade assembly are in an access position allowing access to a wiring channel allowing manipulation of the wiring. When the hanger band is in the mounting position, the wiring can be obscured.

Figure 14:
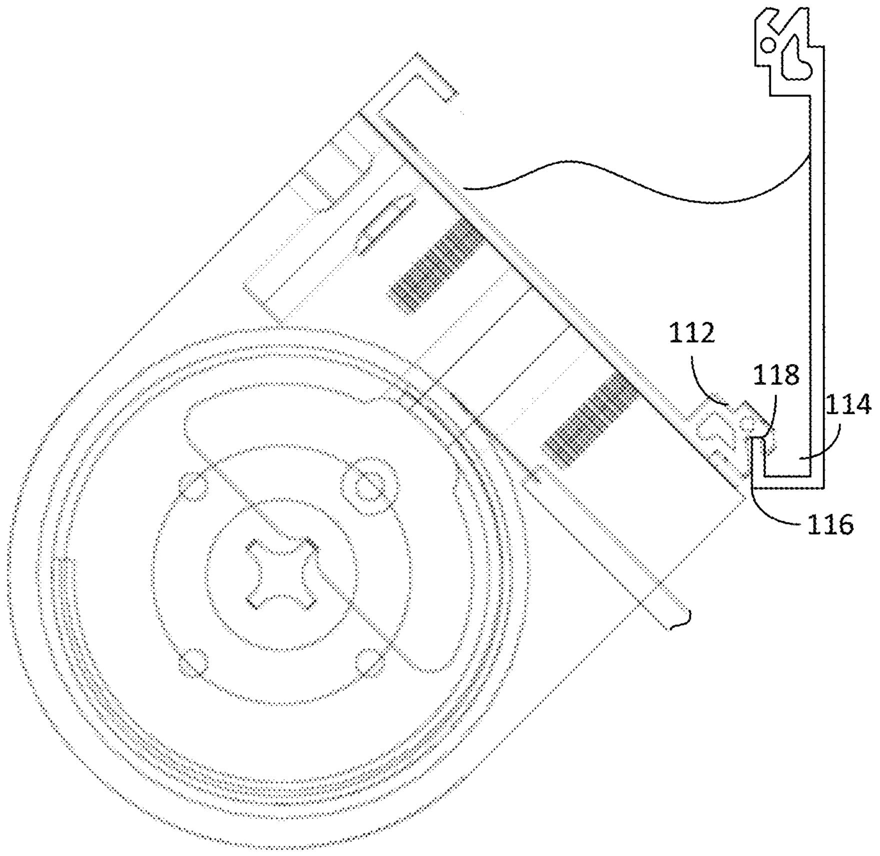
FIG. 14 is a cross-section of aspects of the assembly.

Referring to FIG. 14, the hanger catch 112 can be placed on the support slot 114. A support slot arm 116 can be received into a hanger catch slot 118 and support the hanger band so that the hanger slot is disposed away from the support catch. In this position, access to the wiring is provided. Wiring between the external power source and the roller shade bracket can be connected.

Figure 15:
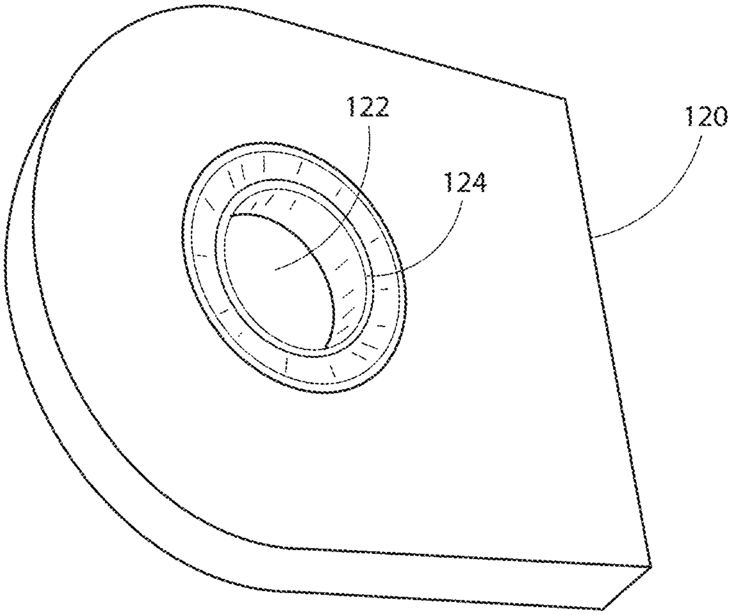
FIG. 15 is a perspective view of aspects of the assembly.

Referring to FIG. 15, a coupling bracket 120 can be attached to the hanger band. The coupling bracket can include a coupling opening 122. The opening can include an idler 124. The opening can receive a portion of a first roller shade assembly allowing the portion of the first roller shade assembly to attach to a second roller shade assembly. The portion of the first roller shade assembly can include a female portion configured to receive a male portion. The female portion and the mail portion can be indexed so that when the first roller shade assembly turns for raising or lowering a first shade, the second roller shade assembly turns to also raise or lower a second shade. Therefore, two roller shade assemblies can be actuated with one motor.

Figure 16:
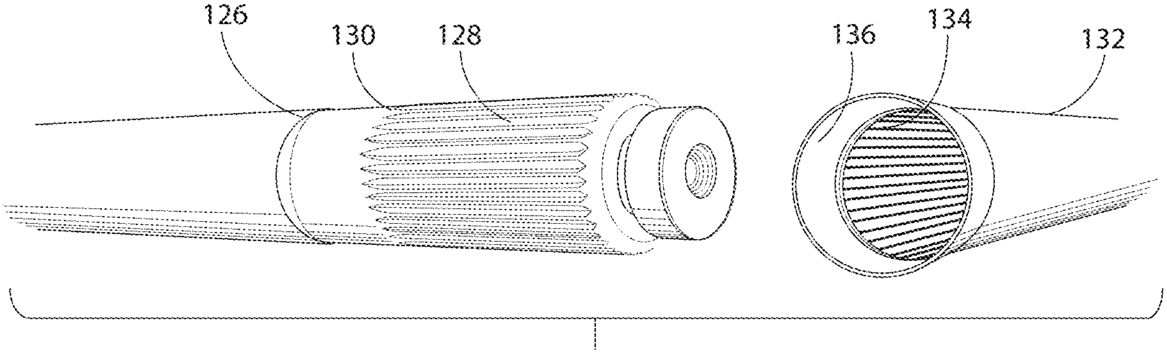
FIG. 16 is a perspective view of aspects of the assembly.

Referring to FIG. 16, one embodiment is shown wherein a first roller shade component can include a center shaft having a first engaging member 126. The first engaging member can include ridges 128 defined on an outer surface 130 of the first roller shaft component. The first roller shaft component can be configured to be received into a second roller shaft component 132. The second roller shaft component can include groves 134 defined in the inner surface 136 of the second roller shaft component. When the first roller shaft component is received in the second roller shaft component, rotation of one causes the rotation of the other. Therefore, only one motor, connected to the first roller shaft component or the second roller shaft component, is needed. A third roller shade assembly can be connected to the second roller shade assembly in the same manner providing for rotation of three roller shade assemblies with one motor.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A roller shade mounting assembly comprising:

a support band configured to be attached to a support surface, wherein the support band includes a support catch and a support slot;

a level attached to the support band;

a first slot defined in the support catch and a second slot defined in the support catch;

a hanger band having a hanger slot and a hanger catch wherein the first slot is configured to receive the hanger band and the support slot is configured to receive the hanger catch when a roller shade bracket attached to the hanger band is in a mounted position;

a wiring channel defined between the support band and the hanger band to receive a first wire, a first connector, a second wire and a second connector when the roller shade bracket is in the mounted position; and, wherein the second slot is configured to receive the hanger band when the roller shade bracket is in an access position and configured to position the hanger catch away from the support slot.

2. The assembly of claim 1 including a hanger slot arm configured to be received in the first slot and the second slot.

3. The assembly of claim 1 wherein the first connector and the second connector are connected by magnetic force.

4. The assembly of claim 1 including a lock configured to secure the hanger band to the support band.

5. The assembly of claim 1 wherein the hanger band is a first hanger band and a second hanger band is supported by the support band.

6. The assembly of claim 1 wherein the hanger band include a left roller shade bracket and a right roller shade bracket affixed to the hanger band.

7. The assembly of claim 6 including a roller shade supported by the left roller shade bracket and the right roller shade bracket.

8. A roller shade mounting assembly comprising:

a support band configured to be attached to a support surface, wherein the support band includes a support catch and a support slot;

a hanger band having a hanger slot and a hanger catch wherein the hanger slot is configured to receive the support catch and the support slot is configured to receive the hanger catch when a roller shade bracket attached to the hanger band is in a mounted position;

a wiring channel defined between the support band and the hanger band to receive a wire when the roller shade bracket is in the mounted position;

an electrical strip attached to the support band and connected to an external power source; and, an electric contact connected to the roller shade bracket and configured to contact the electrical strip when the roller shade bracket is in the mounted position.

9. The assembly of claim 8 wherein the support band and the hanger band are configured to obscure the wire from an observer when the roller shade bracket is in the mounted position.

10. The assembly of claim 8 wherein the electric contact is attached to the electrical strip by a magnetic force.

11. The assembly of claim 8 wherein the wire is an external power wire, and a second wire attaches to the external power wire to provide power to a roller shade motor.

12. The assembly of claim 11 wherein the external power wire and the second wire are connected magnetically.

13. The assembly of claim 8 including a first slot defined in the support catch and a second slot defined in the support catch wherein the second slot is configured to receive a hanger slot arm included in the hanger slot to position the roller shade bracket in an access position.

14. The assembly of claim 8 wherein the hanger slot is configured to receive a support slot arm to position the roller shade bracket in an access position.

15. The assembly of claim 8 including a first slot defined in the support catch and a second slot defined in the support catch wherein an angle between the first slot and the second slot is in a range of twenty to sixty degrees.

16. The assembly of claim 8 wherein an angle of the roller shade bracket in an access position relative to the mounted position is in a range of twenty to sixty degrees.

17. The assembly of claim 8 wherein an angle of the roller shade bracket in an access position relative to the mounted position is forty-five degrees.

* * * * *